United States Patent [19]
Katt

[11] Patent Number: 5,000,038
[45] Date of Patent: Mar. 19, 1991

[54] ROAD TEST SIMULATOR

[75] Inventor: Edwin E. Katt, Kenosha, Wis.

[73] Assignee: Frank L. Wells Company, Kenosha, Wis.

[21] Appl. No.: 368,414

[22] Filed: Jun. 19, 1989

[51] Int. Cl.⁵ ............................................ G01M 15/00
[52] U.S. Cl. .................................................... 73/117
[58] Field of Search ................. 73/117, 117.1, 123–127

[56] References Cited

U.S. PATENT DOCUMENTS

| | | | |
|---|---|---|---|
| 2,601,187 | 6/1952 | Volis | 73/117 |
| 3,411,346 | 11/1968 | Gagliardi | 73/117 |
| 4,393,694 | 7/1983 | Marten et al. | 73/117 |

FOREIGN PATENT DOCUMENTS 2321012 11/1974 Fed. Rep. of Germany ........ 73/117

Primary Examiner—Robert Raevis
Attorney, Agent, or Firm—Michael, Best & Friedrich

[57] ABSTRACT

A road test simulator is provided of the type adapted to be drivingly engaged by a pair of wheels of a vehicle, such as an automobile, which wheels are spaced apart and aligned for rotation about a common axis. The road test simulator includes a first roller unit adapted to receive one of the wheels, a second roller unit spaced from the first roller unit in the axial direction and adapted to receive the other of the wheels, and structure, operable when the road test simulator is in use, for continuously impeding movement of the vehicle in the axial direction.

22 Claims, 2 Drawing Sheets

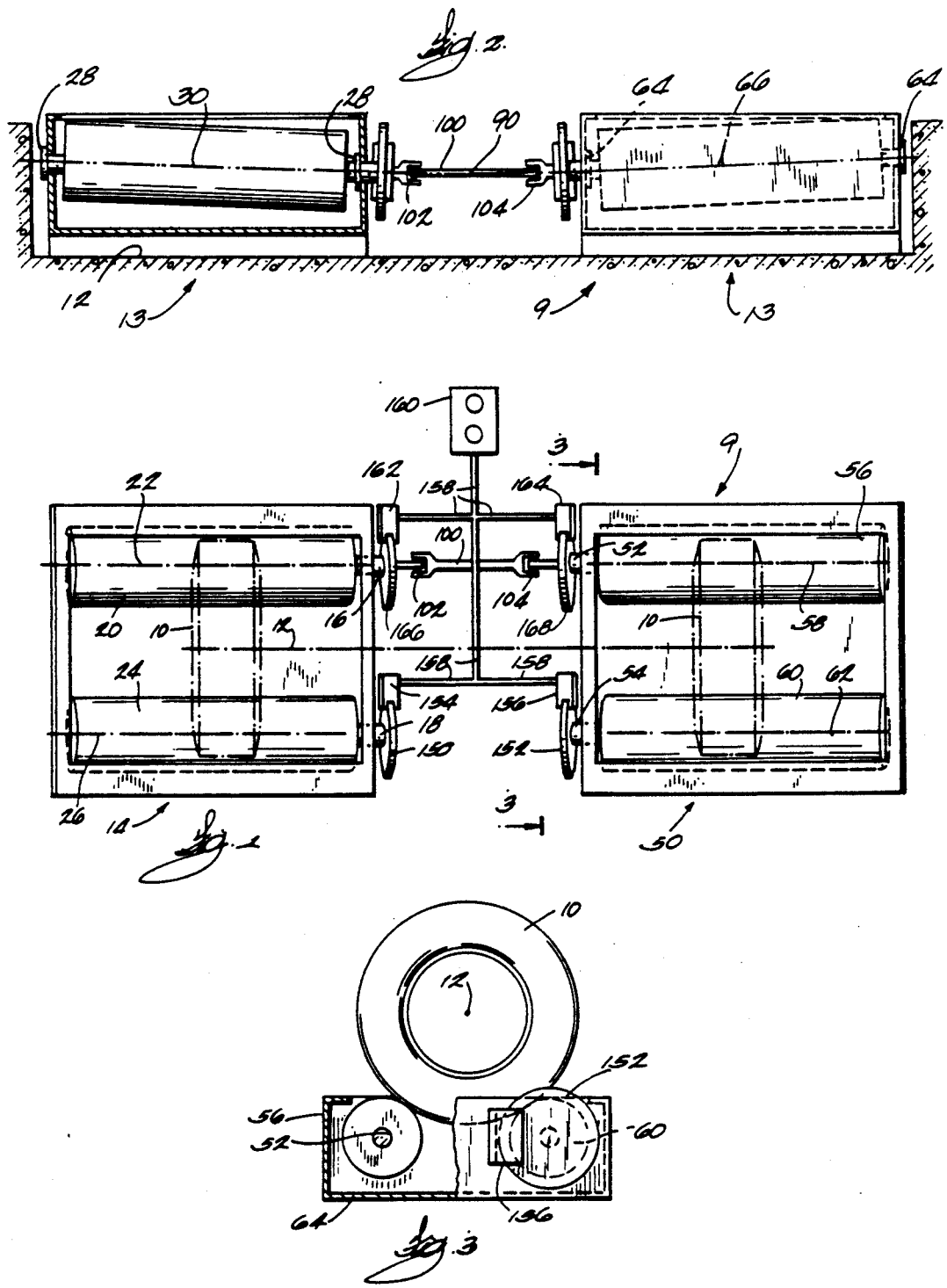

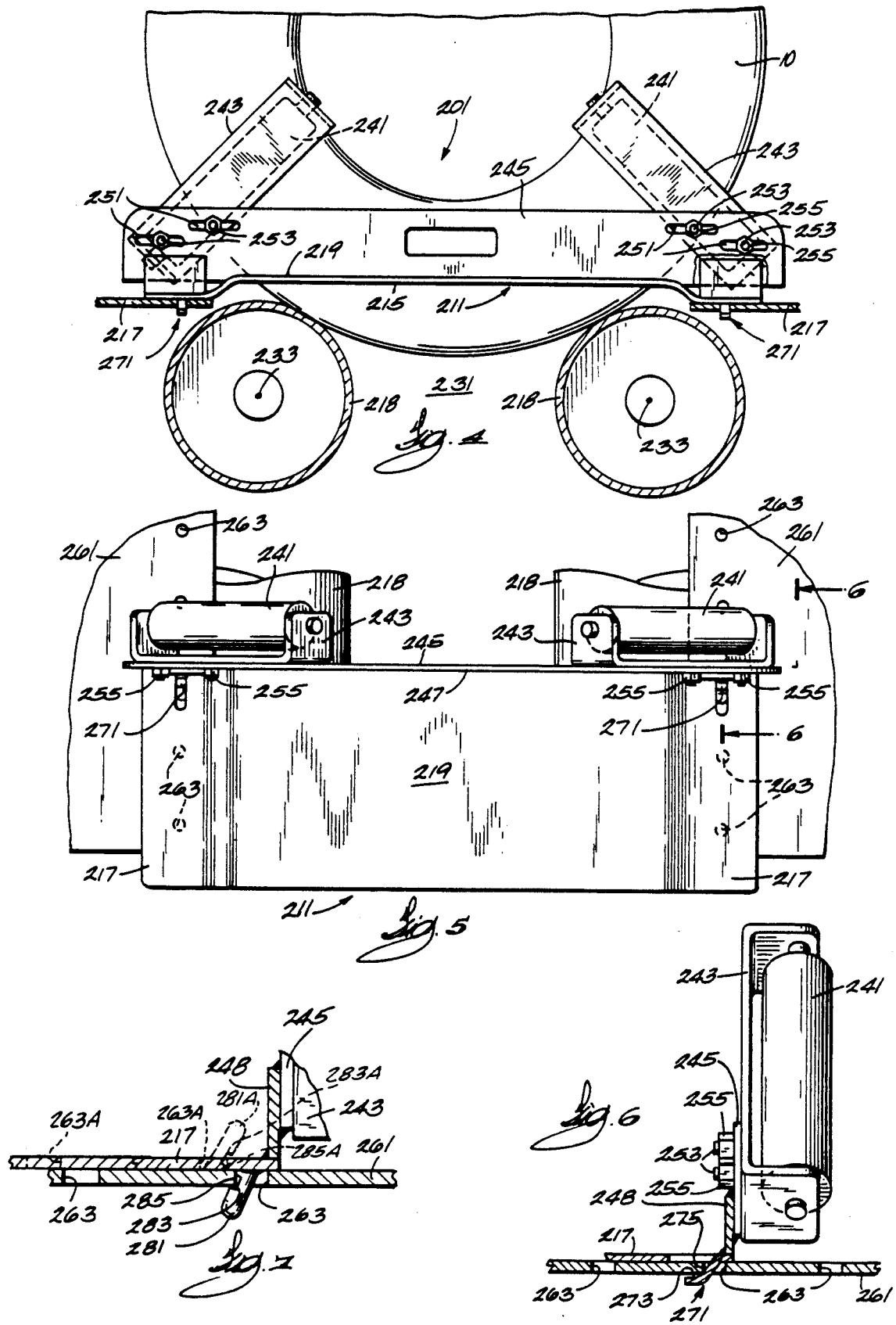

ROAD TEST SIMULATOR

BACKGROUND OF THE INVENTION

The invention relates generally to vehicle testing apparatus and, more particularly, to road test simulators of the type used by automobile mechanics in service garages to simulate actual driving conditions.

While it is known to provide road test simulators, or dynamometers, for measuring performance of a vehicle in a service bay, simulation of high speed vehicle travel can result in lateral "wandering" of the vehicle, thereby resulting in a condition that is potentially injurious to a mechanic conducting the simulation. Wandering is particularly a problem when front wheel drive vehicles are tested.

The present invention relates to road test simulators such as those produced under the trademark INDUCTOR by Frank L. Wells Company of Kenosha, Wis.

SUMMARY OF THE INVENTION

The invention provides a road test simulator of the type adapted to be drivingly engaged by a pair of wheels of a vehicle, such as an automobile, which wheels are spaced apart and aligned for rotation about a common axis, the road test simulator comprising a frame, a first roller unit supported by the frame and adapted to receive one of the wheels, a second roller unit supported by the frame, spaced from the first roller unit in the axial direction, and adapted to receive the other of the wheels, and means operable, when the road test simulator is in use, for continuously impeding movement of the vehicle in the axial direction.

The invention also provides a road test simulator of the type adapted to be drivingly engaged by a pair of wheels of a vehicle, such as an automobile, which wheels are spaced apart and aligned for rotation about a common axis, the road test simulator comprising a frame, a first pair of rollers supported by the frame and adapted to receive one of the wheels thereon, each roller of the first pair of rollers having an axis of rotation, the axes of rotation of the first pair of rollers being parallel to each other, the axes of the first pair of rollers defining a first plane, and a second pair of rollers supported by the frame and adapted to receive the other of the wheels thereon, each roller of the second pair of rollers having an axis of rotation, the axes of rotation of the second pair of rollers being parallel to each other, the axes of the second pair of rollers defining a second plane which intersects the first plane at a line which is perpendicular to the axis of the wheels and to the axes of rotation of the first pair and the second pair of rollers.

The invention also provides a road test simulator of the type adapted to be drivingly engaged by a pair of wheels of a vehicle, such as an automobile, which wheels are spaced apart and aligned for rotation about a common axis, the road test simulator comprising a frame, a first pair of rollers supported by the frame and adapted to receive one of the wheels thereon, each roller of the first pair of rollers having an axis of rotation, the axes of rotation of the first pair of rollers being parallel to each other, the axes of the first pair of rollers defining a first plane, and a second pair of rollers supported by the frame and adapted to receive the other of the wheels thereon, each roller of the second pair of rollers having an axis of rotation, the axes of rotation of the second pair of rollers being parallel to each other, the axes of said second pair of rollers defining a second plane which intersects the first plane at a line which is perpendicular to the axis of the wheels, which is perpendicular to the axes of rotation of the first pair and the second pair of rollers, and which extends horizontally, the axis of rotation of one roller the first pair of rollers being located in a vertical plane with the axis of rotation of one roller of the second pair of rollers, and the axis of rotation of the other roller of the first pair of rollers being located in a vertical plane with the axis of rotation of the other roller of the second pair of rollers, the first plane and the second plane each being inclined at a 1.3 degrees grade relative to horizontal, and upwardly away from each other.

Other features of the invention will become apparent to those skilled in the art upon review of the following detailed description, claims and drawings.

BRIEF DESCRIPTION OF THE DRAWINGS

FIG. 1 is a top plan view of a road test simulator embodying the invention.

FIG. 2 is a broken away front elevational view of the road test simulator shown in FIG. 1.

FIG. 3 is a sectional view taken along line 3—3 of FIG. 2.

FIG. 4 is an enlarged fragmentary side view, partially in section, of another embodiment of a road test simulator incorporating various of the features of the invention.

FIG. 5 is a fragmentary top view of the road test simulator shown in FIG. 4.

FIG. 6 is a fragmentary view taken along line 6—6 of FIG. 5.

FIG. 7 is a view similar to FIG. 6 showing another embodiment of an arrangement for releasably retaining the components of the road test simulator shown in FIG. 4.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT OF THE INVENTION

Shown in FIG. 1 is a road test simulator or dynamometer 9 adapted to be drivingly engaged by a pair of drive wheels 10 of a vehicle (not shown), such as an automobile, which wheels are spaced apart and aligned for rotation about a common axis 12.

The road test simulator 9 includes a frame 13, together with first and second roller units 14 and 50 adapted to receive the drive wheels 10. The frame 13 can be of any suitable construction and in the disclosed construction is shown in a pit 12.

The first roller unit 14 includes a pair of axles, one of which is designated by numeral 16, and the other of which is designated by numeral 18. The first roller unit 14 further comprises a first pair of rollers including a roller 20 mounted on the axle 16 for common rotation therewith about an axis 22, and a roller 24 mounted on the axle 18 for common rotation therewith about an axis 26.

The first roller unit 14 is supported on a first substructure or subframe or bearing holder 28 (see FIG. 2) which is part of the frame 13 and which supports the rollers 20 and 24 by supporting the axles 16 and 18. The axes 22 and 26 are parallel to one another and define a first plane 30 (see FIG. 2).

The second roller unit 50 is spaced from the first roller unit 14 in the direction of the axis 12, and is adapted to receive the other of the wheels 10. The second roller unit 50 includes a pair of axles, one of which is designated by numeral 52, and the other of which is designated by numeral 54. The second roller unit 50 further comprises a second pair of rollers including a roller 56 mounted on the axle 52 for common rotation therewith about an axis 58, and a roller 60 mounted on the axle 54 for common rotation therewith about an axis 62.

The second roller unit 50 is supported on a second substructure or subframe of bearing holder 64 which is part of the frame 13 and which (see FIG. 2) supports the rollers 56 and 60 by supporting the axles 52 and 54. The axes 58 and 62 are parallel to one another and define a second plane 66 (see FIG. 2).

Preferably, the bearing holders 28 and 64 are adjustably mounted on the frame 13 to facilitate adjustment of the angular inclination of the roller bearing units 14 and 50.

Referring to FIG. 2, the road test simulator 9 also includes means operable, when the road test simulator is in use, for continuously impeding movement of the vehicle in the direction of the axis 12.

The movement impeding means comprises any suitable means on the frame 13 for inclining the first roller unit 14 and the second roller unit 50. In the preferred embodiment of the invention, the bearing holders 28 and 64 incline the first roller unit 14 and the second roller unit 50 upwardly and away from each other. However, it is envisioned that the frame 13 could incline the first roller unit 14 and the second roller unit 50 upwardly and towards each other. The bearing holders 28 and 64 incline the first roller unit 14 and the second roller unit 50 so that the first plane 30 intersects the second plane 66 at a horizontal line 90 which is perpendicular to the axis 12 of the wheels 10, and which is perpendicular to the axes 22, 26, 58 and 62. The first plane 30 and the second plane 66 are equi-angularly oriented about the line of intersection 90 relative to horizontal, and, in the preferred embodiment, are each inclined from horizontal at a 1.3 degrees grade. Further, the axis of rotation 22 of the roller 20 is located in a vertical plane with the axis of rotation 58 of the roller 56, and the axis of rotation 26 of the roller 24 is located in a vertical plane with the axis of rotation 62 of the roller 60. In the preferred embodiment, the axis 22 is spaced from the axis 26 by 16½ inches, and the axis 58 is spaced from the axis 62 by 16½ inches.

In the preferred embodiment, the road test simulator includes means for effecting common rotation of the roller 20 with the roller 56. More particularly, the means for effecting common rotation comprises a link 100 (see FIG. 1) connecting the axle 16 to the axle 52, which link includes universal joints 102 and 104. This configuration is used to compensate for wear and uneven inflation of tires that may comprise part of the wheels 10.

The rollers 24 and 60 are respectively supported by the first subframes or bearing holders 28 and 64, for rotation independently of each other, and independently of the rollers 20 and 56.

Also included in the road test simulator of the preferred embodiment is means for applying a load to the wheels 10 of the vehicle, which load can be selected from within a continuous range of possible loads. More particularly, while other arrangements can be employed, a load applying means can be associated with each of the axles 16, 18, 52 and 54. Alternatively, one or more such load applying means can be employed. In the disclosed construction, four such load applying means are employed, one for each of the axles 16, 18, 52 and 54. More specifically, as the load applying means are all identically constructed, only one such means will be described. In this regard, each load applying means comprises a disc 150 mounted on the axle 18 for common rotation therewith, a disc 152 mounted on the axle 54 for common rotation therewith, a caliper 154 positioned in fixed relation with respect to the frame 13, and adapted to selectively supply a rotation impeding force to the disc 150, and a caliper 156 positioned in fixed relation with respect to the frame 13, and adapted to selectively supply a rotation impeding force to the disc 152. The calipers 154 and 156 are air operable, and air pressure is applied to the calipers 154 and 156 via an air hose 158. A controller 160, which can either be wall mounted or hand held, directly controls the pressure of air applied through the hose 158, without the use of solenoids, which pressure determines the rotation impeding force applied from the calipers 154 and 156 to the discs 150 and 152. When air pressure to a caliper is controlled directly, without the use of solenoids, it is possible to adjust load very gradually, without the problem of erratic changes in air pressure associated with solenoid-type systems. Optionally, but preferably, additional calipers 162 and 164, and discs 166 and 168, associated with axles 16 and 52, are included in the means for applying a load. The calipers 162 and 164, and discs 166 and 168, function similarly to the calipers 154 and 156, and the discs 150 and 152.

Illustrated fragmentarily in FIGS. 4 through 7 is another road test simulator or dynamometer 201 which is generally the same as the road test simulator 9 shown in FIGS. 1 through 3, except that the road simulator 201 also includes, on each side thereof, i.e., on each of the opposite sides of an automobile located on the road test simulator 201, a combined guide and platform 211.

As the combined guide and platforms 211 are both of generally the same construction, except for being left and right handed, only one such combined guide and platform 211 will be described.

More particularly, as shown in FIGS. 4 through 7, the combined guide and platform 211 comprises a generally flat plate 215 which includes opposite end portions 217 located beyond or outwardly of an associated pair of parallel rollers 218 (which can be the roller pair 22, 24 or the roller pair 58, 60). The opposite end portions 271 are in supported engagement by a pair of spaced parallel panels 261 forming a part of the frame 13 and located outwardly of the rollers 218. The plate 215 also includes a slightly raised central or bridge or platform portion 219 which extends between the end portions 217 and over the associated pair of parallel rollers 218 and over the space 231 between the rollers 218.

The combined guide and platform 211 also includes means engageable with the adjacent automobile wheel 10 for preventing lateral migration of the automobile in the general direction of the roller axes 233. While other constructions can be employed, in the disclosed construction, such means comprises a pair of guide rollers 241 which are respectively rotatably mounted on U-shaped brackets 243 which, in turn, are respectively adjustably fixed on a flange 245 extending upwardly from the plate edge 247 which extends over the associated rollers 218 and is located adjacent the automobile wheel 10. The outer ends of the flange 245 terminate above the end portions 217 but are fixedly connected thereto and rigidified by plates 248 which are welded to the flange 245 and to the end portions 217.

While other arrangements can be employed, the brackets 243 are mounted on the flange 245 by means locating the guide rollers 241 in right angular relation to each other and in equal angular relation to the flange 245, while affording guide roller adjustment so as to facilitate movement of the guide rollers 241 toward and away from each other. In the disclosed construction such means includes, for each guide roller 241, a pair of horizontally extending and vertically spaced slots 251 formed in one of the flange 245 and the associated bracket 243 and a pair of studs 253 which extend fixedly from the other of the flange 245 and the associated bracket 243 and through the slots 251, together with respective nuts 255 for fixedly tightening the bracket 243 in adjusted position on the flange 245.

The combined guide and platform 211 also includes means for releasably retaining the combined guide and platform 211 in adjustable assembly on the frame 13. While other arrangements can be employed, in the disclosed construction, such means comprises, with respect to each end portion 217, a series of apertures 263 in one of the platform end portion 217 and the associated panel 261, and means on the other of the platform end portion 217 and associated panel 261 for releasable locking engagement in a selected one of the apertures 263 to retain the platform 211 in selected and adjusted position on the frame 13 and against unintended movement in the direction of the roller axes 233.

Various means can be employed for locking engagement in the apertures 263 to releasably retain the platforms 211 in selectively or adjustably spaced position to each other, thereby facilitating automobiles of various sizes. In FIGS. 6, such means comprises, for each platform end portion 217, a finger 271 which is formed out of the material of the end portion 217 and which extends outwardly therefrom and in angular relation thereto to define, between the finger 271 and the end portion 217, a notch 273 which receives a portion 275 of the edge defining the associated one of the apertures 263. The angle of the finger 271 to the end portion 217 desirably prevents disassembly of the platform from the frame 13 in response to mere vertical movement and requires movement to the right as shown in FIG. 6 to effect such disassembly. As can be readily appreciated, should an automobile wheel 10 migrate against the guide rollers 241, such engagement would aid in preventing disassembly of the platform 211 from the frame 13.

Shown in FIG. 7 is another locking means including a finger or post 281 which is suitably fixed to the underside of the end portion 217, which extends in angular relation thereto, and which includes a cut-out or notch 283 adapted to receive an edge portion 285 defining the associated one of the apertures.

Shown in dashed outline in FIG. 7 is an alternative means for releasably retaining the platforms 211 in adjustably selected position on the frame 13 and including a series of apertures 263A in the platform 211 and a finger or post 281A extending fixedly from the platform 211 in angular relation thereto, which finger 281A includes a cut-out or notch 283A adapted to receive an edge portion 285A defining the associated one of the apertures.

The arrangement shown in FIG. 7 serves, as does the arrangement shown in FIG. 6, to prevent disassembly of the platform 211 from the frame 13 by mere vertical movement.

In use, the platform 211 provides a surface upon which a mechanic can stand during testing of the vehicle and additionally serves to prevent undesirable outward migration toward a mechanic of the wheels 10 of the automobile being tested.

The road test simulators 9 and 201 are improvements over the model RTD-4104 manufactured by Inductor Division of Frank L. Wells Co., 5821 5th Avenue, Kenosha, Wis. 53141, but includes the additional feature of the inclined rollers and the platforms 211.

Various of the features of the invention are outlined in the following claims.

I claim:

1. A road test simulator of the type adapted to be drivingly engaged by a pair of wheels of a vehicle, which wheels are spaced apart and aligned for rotation about a common axis, said road test simulator comprising a frame, a first roller unit supported by the frame and adapted to receive one of the wheels, said first roller unit comprising a pair of rollers, a second roller unit supported by said frame, and spaced from the first roller unit to receive the other of the wheels, said second roller unit comprising a pair of rollers, each roller of the first and second roller unit having an axis of rotation that is parallel to and spaced from the axis of rotation of the other roller of the same roller unit, and means operable, when the road test simulator is in use, for continuously impeding movement of the vehicle in the direction defined by the axis about which said wheels are aligned for rotation, said movement impeding means being defined by said frame and comprising subframes including in said frame, said subframes respectively supporting said first roller unit and said second roller unit, said subframes generally inclining said first roller unit and said second roller unit so that a plane containing the axes of rotation of said rollers of said first roller unit intersects a plane containing the axes of rotation of said rollers of said second roller unit at a line which is generally perpendicular to the axis of rotation of each of said rollers, and so that an angle of less than 180 degrees is defined between the planes above the planes.

2. A road test simulator in accordance with claim 1 wherein said first roller unit and said second roller unit are each inclined at about 1.3 degrees relative to horizontal.

3. A road test simulator in accordance with claim 1 wherein said road test simulator includes means for effecting common rotation of one roller of said first roller unit and one roller of said second roller unit, and wherein the other rollers of said first and second roller units are each supported for independent rotation.

4. A road test simulator in accordance with claim 1 and further comprising means for applying a load to the wheels of the vehicle when the road test simulator is in use, which load can be selected from within a continuous range of possible loads.

5. A road test simulator in accordance with claim 4 wherein said first roller unit includes a roller rotatably mounted on an axle, and said means for applying a load comprises a disc rotor mounted on said axle for common rotation with said axle, and a air-operable caliper positioned in fixed relation with respect to said frame and adapted to selectively supply a rotation impeding force to said disc rotor at a magnitude proportional to a magnitude of air pressure supplied to said caliper.

6. A road test simulator in accordance with claim 1 and further including a platform releasably supported by said frame in overlying relation to one of said roller units.

7. A road test simulator in accordance with claim 6 wherein said platform includes a rotatably mounted guide roller adapted to be engaged by the side of a vehicle wheel.

8. A road test simulator in accordance with claim 6 wherein said frame and said platform include means for releasably retaining said platform in an adjustably selected position on said frame.

9. A road test simulator in accordance with claim 8 wherein said means for releasably retaining said platform in adjustably selected position on said frame includes a series of apertures on one of said frame and said platform and a finger extending fixedly from the other of said frame and said platform and receivable in any selected one of said apertures.

10. A road test simulator of the type adapted to be drivingly engaged by a pair of wheels of a vehicle, which are spaced apart and aligned for rotation about a common axis, said road test simulator comprising a frame, a first roller unit supported by the frame and adapted to receive one of the wheels, said first roller unit comprising a pair of rollers, a second roller unit supported by said frame, and spaced from the first roller unit to receive the other of the wheels, said second roller unit comprising a pair of rollers, each roller of the first and second roller unit having an axis of rotation that is parallel to and spaced from the axis of rotation of the other roller of the same roller unit, means operable, when the road test simulator is in use, for continuously impeding movement of the vehicle in the direction defined by the axis about which said wheels are aligned for rotation, and a platform releasably supported by said frame in overlying relation to one of said roller units, said frame and said platform including means for releasably retaining said platform in an adjustably selected position on said frame, said means for releasably retaining said platform in adjustably selected position on said frame including a series of apertures on one of said frame and said platform and a finger extending fixedly from the other of said frame and said platform and receivable in any selected one of said apertures, each of said apertures being defined by an edge and said finger extending at an angle to said other of said frame and said platform and including a notch receiving a portion of said aperture defining edge of the selected one of said apertures so as to preclude disassembly of said platform by reason of movement solely in a direction perpendicularly to said frame.

11. A road test simulator of the type adapted to be drivingly engaged by a pair of wheels of a vehicle, which wheels are spaced apart and aligned for rotation about a common axis, said road test simulator comprising a frame, a first pair of rollers supported by the frame and adapted to receive one of the wheels thereon, each roller of said first pair of rollers having an axis of rotation, the axes of rotation of the first pair of rollers being parallel to each other, the axes of said first pair of rollers defining a first plane, and a second pair of rollers supported by the frame and adapted to receive the other of the wheels thereon, each roller of said second pair of rollers having an axis of rotation, the axes of rotation of the second pair of rollers being parallel to each other, the axes of said second pair of rollers defining a second plane which intersects the first plane at a line which is perpendicular to the axis of the wheels and to the axes of rotation of said first pair and said second pair of rollers.

12. A road test simulator in accordance with claim 11 wherein said frame inclines said first plane and said second plane so that an angle of less than 180 degrees is defined between the first and second planes above the first and second planes.

13. A road test simulator in accordance with claim 11 wherein the line of intersection of the first plane and the second plane extends horizontally.

14. A road test simulator in accordance with claim 13 wherein the first plane and the second plane are equiangularly oriented about the line of intersection of the first plane and the second plane, relative to horizontal.

15. A road test simulator in accordance with claim 14 wherein the first plane and the second plane are each inclined from the line of intersection at 1.3 degrees relative to horizontal.

16. A road test simulator in accordance with claim 11 wherein the axis of rotation of one roller of said first pair of rollers is located in a vertical plane with the axis of rotation of one roller of said second pair of rollers, and the axis of rotation of the other roller of said first pair of rollers is located in a vertical plane with the axis of rotation of the other roller of said second pair of rollers.

17. A road test simulator in accordance with claim 16 wherein the axes of rotation of the first pair of rollers are spaced by less than 17 inches.

18. A road test simulator in accordance with claim 17 wherein the axes of rotation of the first pair of rollers are spaced by approximately 16½ inches.

19. A road test simulator of the type adapted to be drivingly engaged by a pair of wheels of a vehicle, which wheels are spaced apart and aligned for rotation about a common axis, said road test simulator comprising a frame, a first pair of rollers supported by the frame and adapted to receive one of the wheels thereon, each roller of said first pair of rollers having an axis of rotation, the axes of rotation of the first pair of rollers being parallel to each other, the axis of said first pair of rollers defining a first plane, and a second pair of rollers supported by the frame and adapted to receive the other of the wheels thereon, each roller of said second pair of rollers having an axis of rotation, the axes of rotation of the second pair of rollers being parallel to each other, the axes of said second pair of rollers defining a second plane which intersects the first plane at a line which is perpendicular to the axis of the wheels, which is perpendicular to the axes of rotation of said first pair and said second pair of rollers, and which extends horizontally, the axis of rotation of one roller of said first pair of rollers being located in a vertical plane with the axis of rotation of one roller of said second pair of rollers, and the axis of rotation of the other roller of said first pair of rollers being located in a vertical plane with the axis of rotation of the other roller of said second pair of rollers, said first plane and said second plane each being inclined at 1.3 degrees relative to horizontal, less than 180 degrees being defined between the plane defined by the axes of said first pair of rollers and the plane defined by the axes of said second pair of rollers.

20. A road test simulator in accordance with claim 19 and further including means for effecting common rotation of one roller of said first pair of rollers with one roller of said second pair of rollers, and wherein the other rollers of said first and second pairs of rollers are each supported for independent rotation.

21. A road test simulator in accordance with claim 19 and further comprising means for applying a load to the wheels of the vehicle when the road test simulator is in use, which load can b e selected from within a continuous range of possible loads.

22. A road test simulator in accordance with claim 21 and further including an axle supported by said frame, wherein one roller of said first pair of rollers is rotatably mounted on said axle, and wherein said means for applying a load comprises a disc rotor mounted on said axle for common rotation with said axle, and a air-operable caliper positioned in fixed relation with respect to said frame and adapted to selectively supply a rotation impeding force to said disc rotor at a magnitude proportional to a magnitude of air pressure supplied to said caliper.

* * * * *